United States Patent [19]

Chace, Jr. et al.

[11] Patent Number: 5,490,473
[45] Date of Patent: Feb. 13, 1996

[54] EXPENDABLE UNDERWATER VEHICLE

[75] Inventors: Raymond A. Chace, Jr., East Freetown, Mass.; Mark C. Manning, Portsmouth, R.I.

[73] Assignee: Sippican, Inc., Marion, Mass.

[21] Appl. No.: 408,060

[22] Filed: Mar. 21, 1995

[51] Int. Cl.⁶ .................................................. B63G 8/14
[52] U.S. Cl. .................................................. 114/330
[58] Field of Search ........................... 114/312, 313, 114/330, 331, 332, 333, 337, 20 R, 23, 24, 25

[56] References Cited

U.S. PATENT DOCUMENTS

| | | | |
|---|---|---|---|
| 2,975,396 | 3/1961 | Mueller | 340/5 |
| 3,180,295 | 4/1965 | Niederer | 114/20 |
| 3,609,671 | 9/1971 | Webster et al. | 340/3 E |
| 3,676,802 | 7/1972 | Murphree et al. | 340/384 E |
| 3,921,559 | 11/1975 | Wells, Sr. | 114/20 |
| 4,198,703 | 4/1980 | Huisveld, Jr. et al. | 367/1 |
| 5,121,702 | 6/1992 | Johnson et al. | 114/330 |
| 5,235,930 | 8/1993 | Pendleton | 114/330 |
| 5,247,894 | 9/1993 | Haisfield et al. | 114/20.1 |
| 5,249,992 | 10/1993 | Schneider | 114/330 |
| 5,333,570 | 8/1994 | Dubois et al. | 114/330 |
| 5,349,915 | 9/1994 | Thomas et al. | 114/330 |

OTHER PUBLICATIONS

MK39 EMATT brochure, published by Sippican, Inc. about 1993, two pages.

*Primary Examiner*—Stephen Avila
*Attorney, Agent, or Firm*—Testa, Hurwitz & Thibeault

[57] ABSTRACT

An expendable underwater vehicle for use in training naval forces in anti-submarine warfare in ocean waters is between about three to five feet in length and about five inches in diameter, and it includes various improvements which make successful operation in the ocean waters possible. The improvements include an in-water variable speed feature, a variable tonal levels feature, an autonomous evasion feature, and a high-power integrated pinger feature. One or more of these features can be combined to provide an extremely effective and versatile expendable underwater training vehicle.

3 Claims, 8 Drawing Sheets

EXPENDABLE UNDERWATER VEHICLE

STATEMENT REGARDING FEDERALLY SPONSORED RESEARCH

This invention was made with government support under Contract No. N00024-91-C-6127 awarded by the Department of the Navy. The government has certain rights in the invention.

FIELD OF THE INVENTION

This invention relates to expendable underwater vehicles, and more particularly, various improvements to expendable underwater vehicles.

BACKGROUND OF THE INVENTION

An expendable underwater vehicle, such as the Expendable Mobile ASW (Anti-Submarine Warfare) Training Target (EMATT) which is available from Sippican, Inc. of Marion, Mass., is used to train naval forces in the detection, localization, tracking, and/or attack of a submarine in the ocean (i.e., to train naval forces in anti-submarine warfare). After being launched into the ocean, the expendable underwater vehicle "swims" a pre-programmed underwater course at a relatively constant speed (e.g., between 8 and 9 knots) as it acoustically simulates a submarine. The naval forces use acoustics to detect, localize, track, and/or attack the simulated submarine. After a specified time, currently about three hours, the internal batteries of the expendable underwater vehicle become exhausted, and the vehicle drops to the bottom of the ocean.

The expendable underwater vehicle can be launched into the ocean from, for example, either a surface ship or an aircraft. When launched by a surface ship, the expendable underwater vehicle is dropped into the water, usually from a short distance thereabove such that the impact is minimal and no damage results. In an aircraft launch, the expendable underwater vehicle cannot simply be dropped into the water because the impact with the water typically will damage the vehicle. Additional hardware is used in an aircraft launch to help the vehicle survive the impact with the water. The additional hardware typically is referred to collectively as an air launch assembly.

To air launch the expendable underwater vehicle, it is fitted with the air launch assembly, and then the combination typically is packaged in a sonobuoy launch container. The vehicle then can be launched from the aircraft either by using a launching tube on the aircraft that accepts the sonobuoy launch container and automatically upon command ejects the vehicle from the container, or by manually removing the vehicle from the sonobuoy launch container and dropping (launching) the unit through a launching tube or other opening in the aircraft. After the vehicle is launched from the aircraft, the air launch assembly deploys and decelerates the vehicle such that the vehicle enters the water nose-first and along its longitudinal axis.

SUMMARY OF THE INVENTION

The invention relates to an expendable underwater vehicle for use in training naval forces in anti-submarine warfare in ocean waters. The vehicle has a body which is between about three to five feet in length and about five inches in diameter, and the vehicle includes various improvements which make successful operation in the ocean waters possible.

In one aspect, the invention features an expendable underwater vehicle whose speed can be varied as it travels a course through the ocean. The vehicle thereby provides a more challenging and realistic submarine simulation to the naval forces training with the vehicle. In operation, actual submarines typically do not travel at a constant speed, especially when making evasive maneuvers. Also, an actual submarine may travel at a slow speed for a period of time (e.g., when transiting) and then speed up. The expendable underwater vehicle according to this aspect of the invention can have at least two speeds at which it travels through the ocean, e.g., a slow speed of about 2 knots and a high speed of about 10 knots. The vehicle preferably can travel at any speed within the range from the slow speed to the high speed.

In another aspect, the invention involves an expendable underwater vehicle which can vary the output levels (amplitudes) of the acoustic tones it projects into the ocean to simulate a submarine. The vehicle can therefore be used to train naval personnel having a wide range of tracking experience. For example, inexperienced personnel could benefit and build tracking skills by training with a target that generates relatively loud and strong acoustic signals, whereas more experienced trackers also could have their skills challenged by training with the same target generating relatively soft and weak acoustic signals.

In still another aspect of the invention, an expendable underwater vehicle takes evasive action when it detects that it is being tracked. The vehicle thereby provides a more challenging and realistic submarine simulation to the naval forces training with the vehicle. Actual submarines typically make an evasive maneuver when they detect that they are being tracked. The expendable underwater vehicle according to this aspect of the invention preferably returns to its originally-set course after it completes its evasive maneuver.

In a further aspect, the invention relates to an expendable underwater vehicle having a higher-power acoustic pinger integrated thereinto. The pinger creates particular acoustic signals which are required for the vehicle to be tracked on an instrumented training range such as the Southern California Offshore Range Extension (SCORE) range and the Atlantic Undersea Test and Evaluation Center (AUTEC) range. The high-power integral pinger does not interfere with any other functions which the vehicle must perform, and the vehicle retains it's full submarine simulation capabilities.

In general, while each aspect of the invention are described herein as a separate and distinct feature of the expendable underwater vehicle, it is possible and desirable in many instances to combine one or more of these features together to provide an even more effective and versatile training vehicle. For example, combining the variable speed, variable tonal levels, and autonomous evasion features into a single expendable underwater vehicle results in an extremely effective and useful device for training both experienced and inexperienced naval personnel.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

Figure 1:
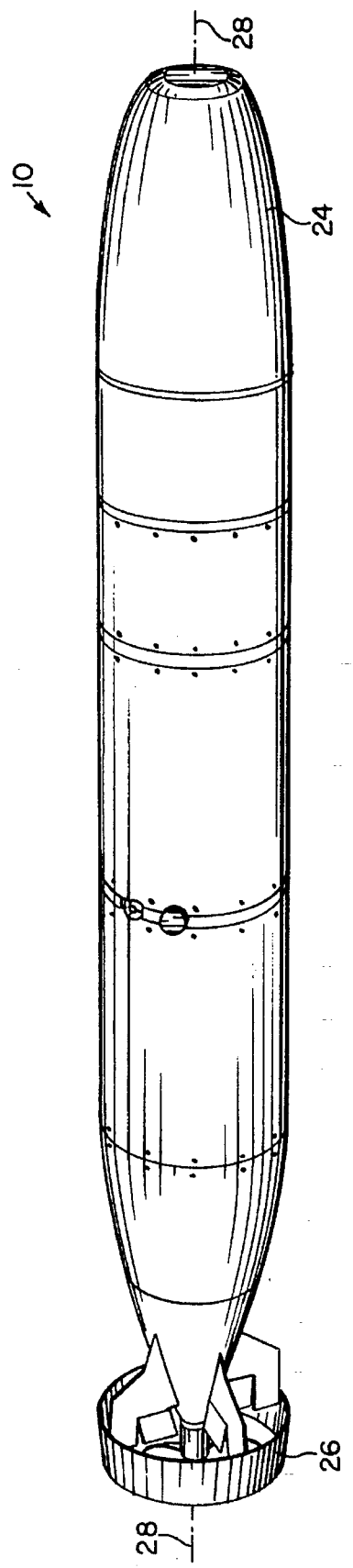
FIG. 1 is a perspective view of an expendable underwater vehicle.
Figure 2:
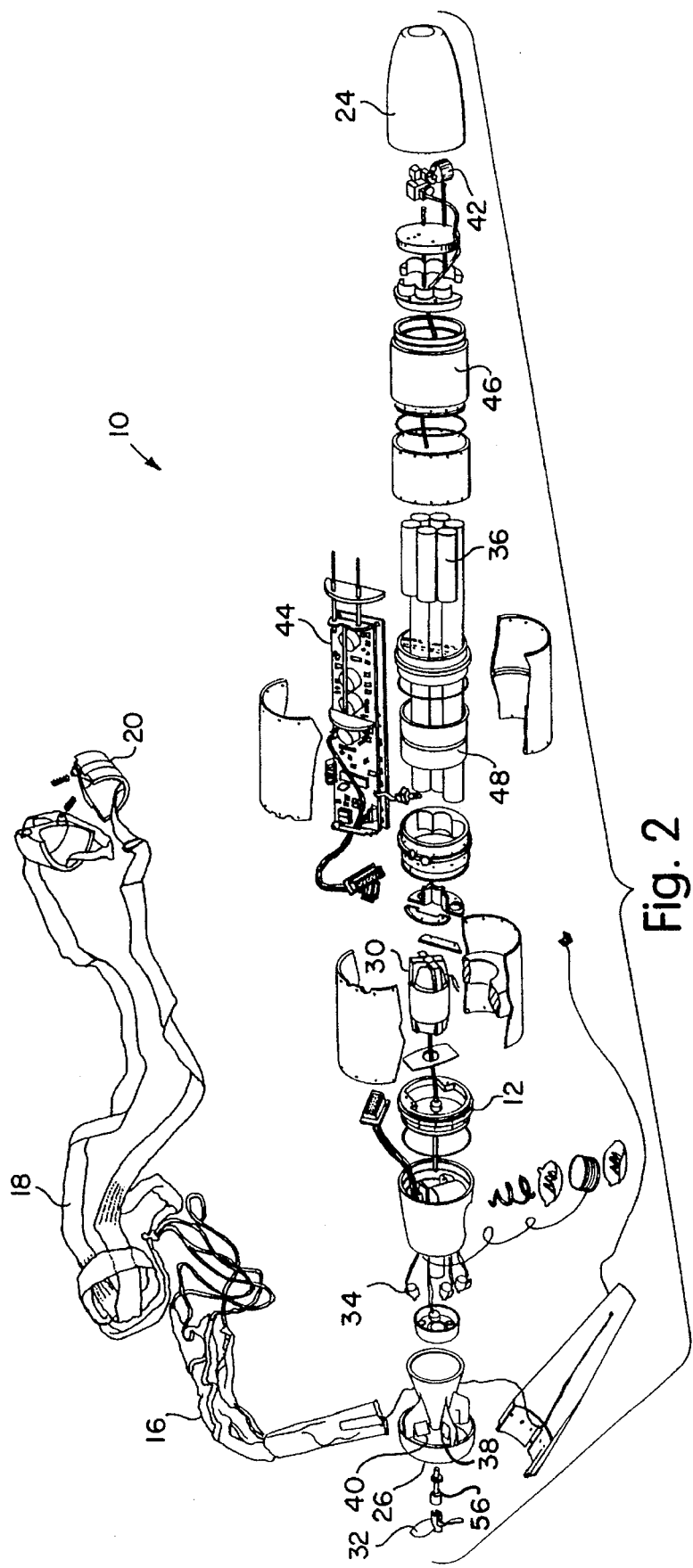
FIG. 2 is an exploded perspective view of the expendable underwater vehicle of FIG. 1, and an air launch assembly for use therewith.

Referring to FIGS. 1 and 2, an expendable underwater vehicle 10, such as an Expendable Mobile ASW (Anti-Submarine Warfare) Training Target (EMATT) which is available from Sippican, Inc. of Marion, Mass., is a battery-powered, self-propelled unit which is about three feet long, about five inches in diameter at its thickest point, and about twenty-five pounds in weight. The vehicle is occasionally referred to herein as a target. The vehicle can range up to about five feet in length. In ASW training exercises, the vehicle 10 is used to simulate a submarine, and it performs a three-hour pattern with varying headings and depths. After being launched into the water, the vehicle 10 turns on and "swims" when a pressure switch 12, mounted on the hull of the vehicle 10, closes. The pressure switch 12 closes when the negatively buoyant vehicle 10 sinks below a specified depth, currently thirty feet. The closing of the pressure switch 12 causes battery power to be provided to the vehicle 10.

The vehicle 10 includes a nose 24 at a front end and a shroud 26 at a rear end. Between the nose 24 and the shroud 26 is a generally watertight compartment which houses a DC motor 30 for driving a propeller 32, a guidance and control subsystem for implementing a preprogrammed course for the vehicle in the ocean by controlling the motor 30 and solenoids 34 to cause the vehicle to follow the course, a signal processing subsystem, and a battery pack 36 for supplying power to the signal processing subsystem, the guidance and control subsystem, the motor 30, and the solenoids 34. The battery pack 36 preferably includes one or more lithium batteries (e.g., $LiSO_2$), although in general other power sources can be used such as one or more non-lithium batteries (e.g., Mg—AgCl Seawater). The solenoids 34 are actuators which move elevators 38 and rudders 40 at the command of the guidance and control subsystem.

The guidance and control subsystem includes a fluxgate compass 42, the pressure sensor 12, the solenoids 34, and electronics 44 (see guidance and control microcomputer 58 below). The signal processing subsystem simulates a submarine by generating signals representative of the submarine and causing corresponding acoustic signals to be transmitted into the ocean. The signal processing subsystem includes the electronics 44 (see signal processor microcomputer 59 below), a forebody projector 46, and at least one midbody projector 48. The forebody projector 46 is an acoustic transducer which, under the control of the electronics 44, receives acoustic interrogations from an external source (e.g., from an active sonobuoy or some other active sonar system) and then transmits acoustic signals representative of echoes which the submarine would return. The forebody projector 46 thus is an active echo receiver/repeater. The midbody projectors 48 are acoustic transducers which, under the control of the electronics 44, generates "noise" which simulates the sound of the running submarine. The midbody projectors 48 thus generate a passive acoustic signature of the simulated submarine.

The vehicle 10 can be launched either from a surface ship by manually dropping it into the water or from an aircraft by using additional hardware. In one embodiment, the additional hardware used in an air launch includes a windflap 14, a parachute 16, a harness 18, and a nose cup assembly 20.

The vehicle 10 can be air launched from an aircraft by loading it into and then firing it out of a sonobuoy launch container or from a gravity tube on the aircraft. Prior to loading the vehicle 10 into the sonobuoy launch container, the nose cup 20 is placed over the nose 24, and the harness 18 is releasably secured to the cup and extends on either side of the vehicle 10 along its length to the shroud 26. The parachute 16 is tucked in around the shroud 26 and then the windflap 14 is put in place such that the entire assembly fits into the sonobuoy launch container. Once the vehicle 10 is launched out of the sonobuoy launch container and into the air, the windflap 14 deploys the parachute 16 and, in so doing, the windflap 14 separates from the vehicle 10 while the vehicle 10 is in flight. The deployed parachute 16 then decelerates the vehicle 10 and causes it to enter the water nose-first and along its longitudinal axis 28.

In the air launch configuration which uses the nose cup assembly 20, while the vehicle 10 is in flight, a release band helps to secure the harness 18 to the cup assembly 20 while the vehicle 10 is in flight. Upon water impact, a plunger in the face of the cup assembly 20 is depressed by the force of the impact, and the release band is thereby released allowing the harness 18 and the parachute 16 to disconnect from the vehicle 10. The cup assembly 20 bears the brunt of the impact, which impact typically is strong enough to damage the nose 24 if the nose 24 is unprotected (e.g., if the cup assembly 20 is not fitted over the nose 24.

VARIABLE SPEED

One aspect of the invention features an expendable underwater vehicle whose speed can be varied as it travels a course through the ocean. The vehicle thereby provides a more challenging and realistic submarine simulation to the naval forces training with the vehicle. The expendable underwater vehicle according to this aspect of the invention can have at least two speeds at which it travels through the ocean, e.g., a slow speed of about 2 knots and a high speed of about 10 knots. The low speed capability of the vehicle enables it to provide a reasonable low Doppler target for various weapons systems. This variable speed feature can be coupled with an autonomous evasion capability (described hereinafter with reference to FIGS. 6 and 7) to provide a low cost target capable of simulating typical behaviors of, for example, a diesel submarine taking evasive maneuvers.

Figure 3:
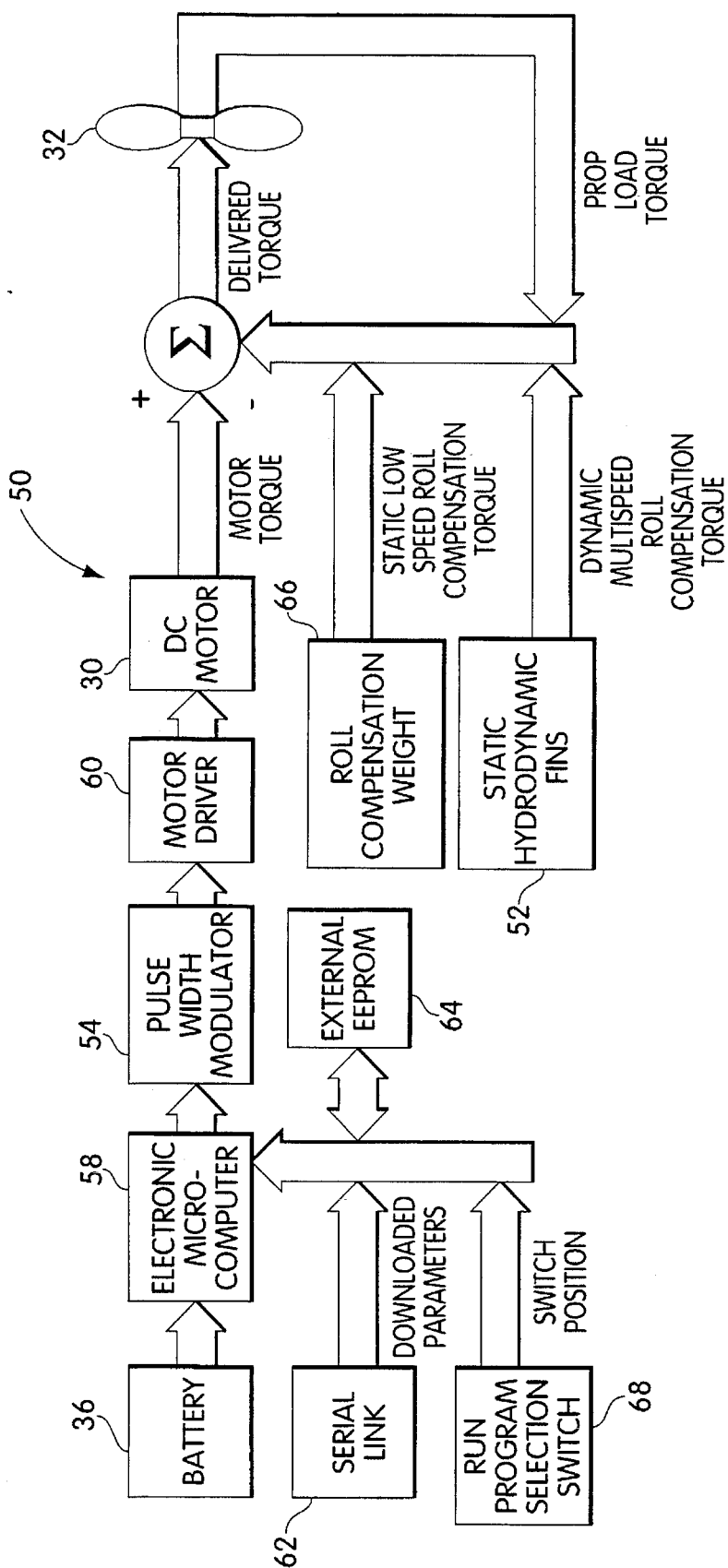
FIG. 3 is a block diagram of a speed control system according to one aspect of the invention.
Figure 4:
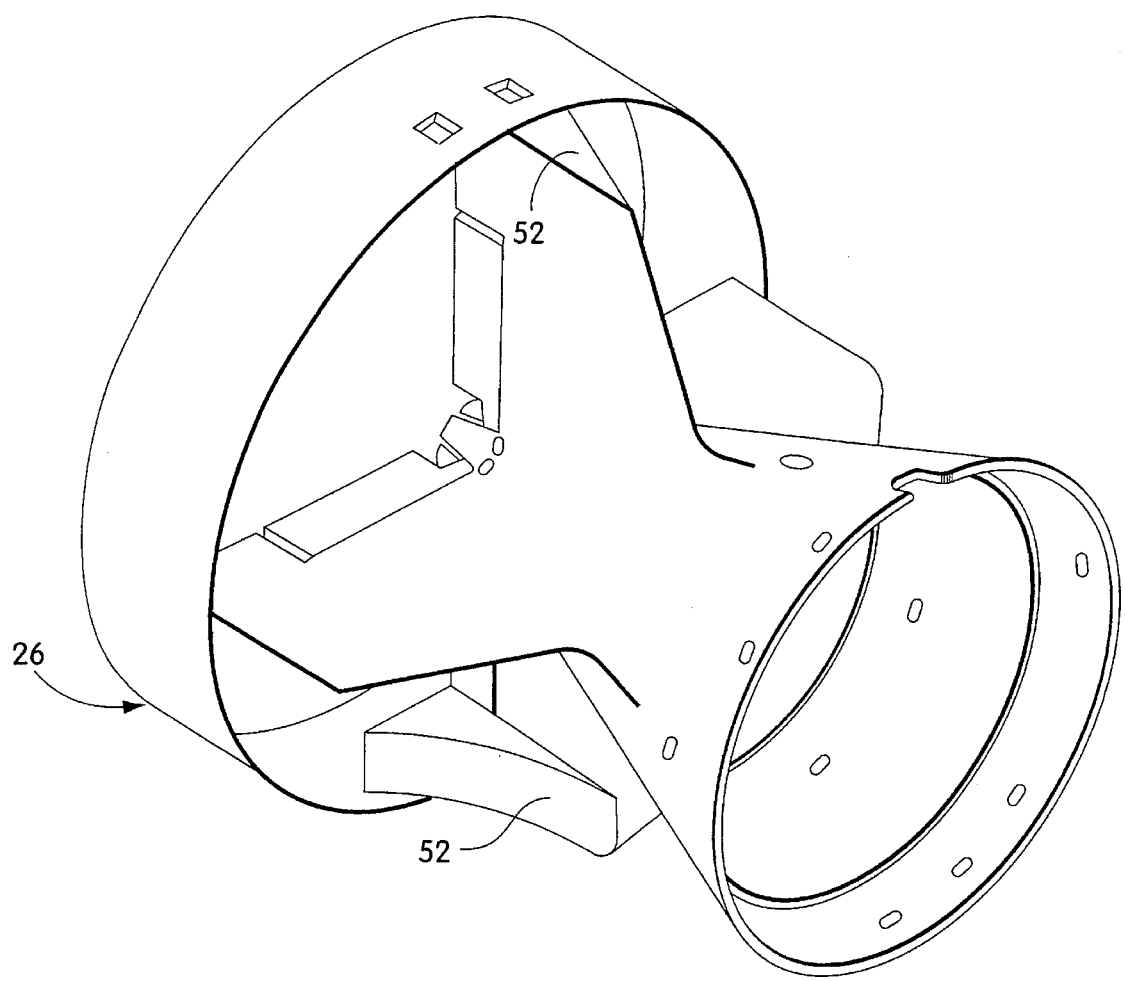
FIG. 4 is a perspective view of passive hydrodynamic fins which compensate for roll of an expendable underwater vehicle utilizing the speed control system of FIG. 3.

Referring to FIGS. 3 and 4, the expendable underwater vehicle according to this aspect of the invention includes a speed control system 50 having passive hydrodynamic fins.

One of the fins 52 is shown in FIG. 4 in its entirety, while the other fin 52 is partially hidden by the shroud ring. Note that the terms passive and static are used herein interchangeably when referring to these fins. In this aspect of the invention, a pulse width modulator (PWM) 54 provides the drive mechanism for the variable motor speed capability which controls the in-ocean speed of the vehicle, and the fins 52 provide roll torque compensation as a function of the vehicle's speed.

The speed of the vehicle is proportional to the revolutions per minute (RPMs) of a shaft 56 and the propeller 32. The RPMs of the shaft 56 are controlled by an electronic microcomputer 58 and the PWM 54, which both can be located in the electronics 44 of FIG. 2. In a preferred embodiment, a microprocessor, such as an Intel 87C51FX, performs the functions of the PWM 54 and the electronic microcomputer 58. Output signals from the PWM 54 are sent to a motor driver circuit 60 which includes a voltage level translator and a field effect transistor (FET) based switching power amplifier. This amplifier portion of the motor driver 60 efficiently supplies the DC motor 30 with the power required to propel the vehicle at in-ocean speeds ranging from about 2 knots up to about 10 knots. The vehicle's speed is controlled by changing the duty cycle of the output of the PWM 54. The modulation frequency of the PWM 54 and the inductance of the motor 30 are selected to average the current supplied to the motor 30 by the motor driver 60. The average current supplied to the motor 30 causes a constant torque to be applied to the propeller 32 of the vehicle. A pressure difference developed on the blade face of the propeller 32 (e.g., the side of the propeller facing aft) converts the rotational torque into forward thrust to propel the vehicle through the ocean at speeds ranging from about 2 to 10 knots.

This generated torque causes a hydrodynamic body moment which tends to cause the vehicle to roll about its longitudinal axis 28. This force is counterbalanced, in accordance with this aspect of the invention, such that the vehicle maintains a roll angle of zero or substantially zero degrees. This near-zero degree roll angle keeps the rudders 40 vertical and the elevators 38 horizontal. Note that the rudder 38 is a single piece and the two flaps thereof are thus connected and move together. The two rudder 38 flaps cannot move independently, and thus cannot actively control roll. The same is true for the elevator 40.

When the vehicle is traveling at a slower speed (e.g., 2 knots), the generated torque (e.g., 2 inch-ounce) is counterbalanced by a static weight 66 that is positioned off of the vehicle's center-line longitudinal axis 28. The additional torque generated by the propeller when the vehicle is traveling at higher speeds (e.g., 44 inch-ounce at 10 knots) is counterbalanced by the two static hydrodynamic fins 52 which are located on the shroud 26 of the vehicle. As the speed of the vehicle increases (or decreases), the torque generated by the propeller increases (or decreases), and the counterbalancing torque generated by the fins 52 also increases (or decreases), the fins 52 thereby balancing the effective roll moment to maintain a near-zero degree vehicle roll angle.

The guidance and control functions of the vehicle can be performed by the electronic microcomputer 58. The course implemented by the guidance and control subsystem is preprogrammed into the vehicle at the factory. A number of courses can be pre-programmed into the vehicle at the factory. These courses are also referred to as "run geometries". With the variable speed capability, the vehicle can be pre-programmed at the factory with various run geometries and speed profiles. Each course can have a sequence of speed changes. At the factory, the run geometries and speed profiles are downloaded to the electronic microcomputer 58 via a link 62 such as a serial link. The electronic microcomputer 58 stores this information in a memory 64 such as a non-volatile EEPROM memory. In operation, the electronic microcomputer 58 accesses the data in the memory 64 and uses it to control the vehicle's maneuvers. These maneuvers are pre-programmed depth, heading, and speed changes. In a preferred embodiment, up to twenty-two different maneuvers are associated with each run, and up to six different runs are possible. All of this data is stored in the memory 64. A run program selection switch 68 is provided on the vehicle exterior to allow a field user to select one of the six possible run geometries. In the preferred embodiment, three of the six allow a magnetic anomaly detector (MAD) function of the vehicle to be utilized and the other three are non-MAD. MAD refers to the vehicle's simulation of a magnetic signature of a submarine.

Table 1 shows an example of run geometry/speed profile data for a single run. The electronic microcomputer 58 sequentially executes each of the twenty-two maneuvers (indicated by the twenty-two rows or "segments" in the table) one at a time for the time specified until the cumulative exit time (CUM TIME) conditions are met or the maximum run time (e.g., three hours) is met.

TABLE 1

| SEG-MENT | DEPTH (feet) | HEADING (deg mag) | SPEED (knots) | TIME EXIT (minutes) | CUM TIME (minutes) |
|---|---|---|---|---|---|
| 1 | 75 | 25 | 2 | 10 | 10 |
| 2 | 75 | 25 | 3 | 10 | 20 |
| 3 | 150 | 70 | 4 | 10 | 30 |
| 4 | 150 | 70 | 5 | 10 | 40 |
| 5 | 225 | 115 | 6 | 10 | 50 |
| 6 | 225 | 115 | 7 | 10 | 60 |
| 7 | 300 | 160 | 8 | 10 | 70 |
| 8 | 300 | 160 | 9 | 10 | 80 |
| 9 | 375 | 205 | 10 | 10 | 90 |
| 10 | 375 | 205 | 9.5 | 10 | 100 |
| 11 | 450 | 250 | 8.5 | 10 | 110 |
| 12 | 450 | 250 | 7.5 | 10 | 120 |
| 13 | 525 | 295 | 6.5 | 10 | 130 |
| 14 | 525 | 295 | 5.5 | 10 | 140 |
| 15 | 600 | 340 | 4.5 | 10 | 150 |
| 16 | 600 | 340 | 3.5 | 10 | 160 |
| 17 | 525 | 25 | 2.5 | 10 | 170 |
| 18 | 525 | 25 | 2 | 10 | 180 |
| 19 | 450 | 70 | 3 | 10 | 180 |
| 20 | 450 | 70 | 4 | 10 | 180 |
| 21 | 75 | 115 | 5 | 10 | 180 |
| 22 | 75 | 205 | 6 | 10 | 180 |

VARIABLE TONAL LEVELS

Another aspect of the invention involves an expendable underwater vehicle which can vary the acoustic tonal levels it projects to simulate a submarine. By varying the output levels (amplitudes) of the acoustic tones it projects into the ocean to simulate a submarine signature, the vehicle can be used to train naval personnel having a wide range of experience. For example, inexperienced personnel could benefit and build tracking skills by training with a target that generates relatively strong signals, whereas more experienced trackers also could benefit by training with the same target generating relatively weak signals. This variable tonal level feature can be combined with the variable speed feature described previously (FIGS. 3 and 4) and the autonomous evasion capability (described hereinafter with reference to FIGS. 6 and 7) to provide a low cost target capable of simulating typical behaviors of, for example, a diesel submarine taking evasive maneuvers.

Figure 5:
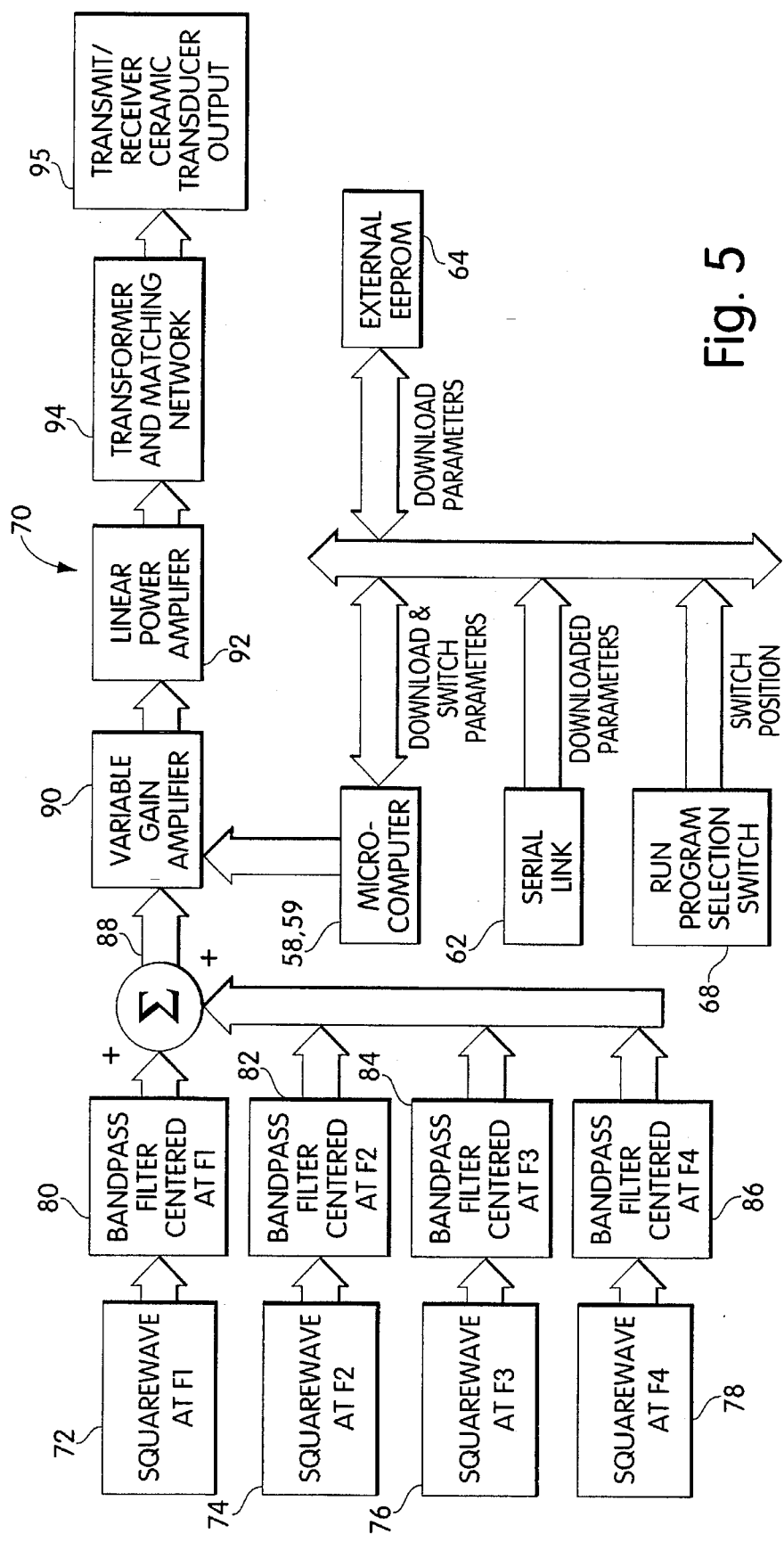
FIG. 5 is a block diagram of a tonal level control system according to another aspect of the invention.

Referring to FIG. 5, the expendable underwater vehicle according to this aspect of the invention includes a tonal level control system 70. The control system 70 allows the vehicle to vary the amplitudes of the acoustic tones it creates and projects (via the midbody projectors 48 of FIG. 2) to simulate a submarine passive signature. More specifically, in a preferred embodiment, the vehicle is capable of emitting four discrete tonal lines (preferably about 450 Hz, 600 Hz, 720 Hz, and 900 Hz) to create the above-mentioned passive acoustic submarine signature, wherein each of the tones can have a variable sound pressure level (SPL) (i.e., acoustic signal amplitude) from between 89 dB//uPa at 1 meter to 133 dB//uPa at 1 meter. The unit "dB//uPa" represents decibels relative to one micropascal, and the micropascal is a reference standard for intensity in underwater sound. This wide dynamic range of about 40 dB of SPLs for each of the tonals makes the vehicle very flexible and useful in a wide variety of training scenarios. In a preferred embodiment, there are ninety-nine linear steps within the wide dynamic range (i.e., 89–133 dB) of each of the four tonals. This results in ninety-nine incremental steps of about 0.4–0.5 dB each for this preferred embodiment which means the amplitude of each tonal can be set to a very precise value within the stated range.

The tonal level control system 70 includes four squarewave generators 72, 74, 76, 78. Each of the four generators produces a different discrete frequency F1, F2, F3, F4. In a preferred embodiment, each of these four frequencies are generated by counting down a crystal oscillator output signal. A bandpass filter 80, 82, 84, 86 at the output of each generator 72, 74, 76, 78 removes harmonics contained in the squarewave and passes a low distortion fundamental sine wave frequency (F1, F2, F3, F4). These four pure tones are then summed to form a composite signal 88. A variable gain amplifier 90 amplifies this composite signal under the control of a microcomputer which is performing the signal processing 59 and/or guidance and control 58 functions of the vehicle. A linear amplifier 92 receives the output of the variable gain amplifier 90 and drives a ceramic transducer 95 via a transformer and matching network 94. This transducer 95 implements the passive acoustic signature generation function of the midbody projectors 48 (FIG. 2) mentioned previously.

With this variable tonal level capability, the vehicle can be pre-programmed at the factory with various run geometries and tonal levels (and speed profiles if the variable speed capability is also utilized). At the factory, the tonal levels, and usually the run geometries as well as the speed profiles, are downloaded to the microcomputer (58 and/or 59) via the link 62. The microcomputer stores this information in the memory 64. In operation, the microcomputer accesses the data in the memory 64 and uses it to control the tonal levels (and usually the vehicle maneuvers via the run geometry and/or speed profile-data, which maneuvers preferably are pre-programmed depth, heading, and speed changes). In a preferred embodiment, up to twenty-two different maneuvers are associated with each run, and up to six different runs are possible. All of this data is stored in the memory 64. The run program selection switch 68 provided on the vehicle exterior allows a field user to select one of the six possible runs. In the preferred embodiment, three of the six allow MAD and the other three are non-MAD. Also, in the preferred embodiment, the tonal amplitude changes as a function of the switch 68 (and usually speed).

Table 2 shows an example of run geometry and tonal level attenuation (and speed in this case) profile data for a single run. The microcomputer sequentially executes each of the twenty-two maneuvers (indicated by the twenty-two rows or "segments" in the table) one at a time for the time specified until the cumulative exit time (CUM) conditions are met or the maximum run time (e.g., three hours) is met.

TABLE 2

| SEG | DEPTH (feet) | HEAD-ING (dg mag) | SPEED (knots) | TONAL ATTN (dB) | TIME EXIT (mins) | CUM TIME (mins) |
|---|---|---|---|---|---|---|
| 1 | 75 | 25 | 2 | 40 | 10 | 10 |
| 2 | 75 | 25 | 3 | 30 | 10 | 20 |
| 3 | 150 | 70 | 4 | 25 | 10 | 30 |
| 4 | 150 | 70 | 5 | 20 | 10 | 40 |
| 5 | 225 | 115 | 6 | 15 | 10 | 50 |
| 6 | 225 | 115 | 7 | 10 | 10 | 60 |
| 7 | 300 | 160 | 8 | 6 | 10 | 70 |
| 8 | 300 | 160 | 9 | 3 | 10 | 80 |
| 9 | 375 | 205 | 10 | 0 | 10 | 90 |
| 10 | 375 | 205 | 9.5 | 2 | 10 | 100 |
| 11 | 450 | 250 | 8.5 | 4 | 10 | 110 |
| 12 | 450 | 250 | 7.5 | 8 | 10 | 120 |
| 13 | 525 | 295 | 6.5 | 12 | 10 | 130 |
| 14 | 525 | 295 | 5.5 | 17 | 10 | 140 |
| 15 | 600 | 340 | 4.5 | 22 | 10 | 150 |
| 16 | 600 | 340 | 3.5 | 27 | 10 | 160 |
| 17 | 525 | 25 | 2.5 | 35 | 10 | 170 |
| 18 | 525 | 25 | 2 | 40 | 10 | 180 |
| 19 | 450 | 70 | 3 | 30 | 10 | 180 |
| 20 | 450 | 70 | 4 | 25 | 10 | 180 |
| 21 | 75 | 115 | 5 | 20 | 10 | 180 |
| 22 | 75 | 205 | 6 | 15 | 10 | 180 |

AUTONOMOUS EVASION

Figure 6:
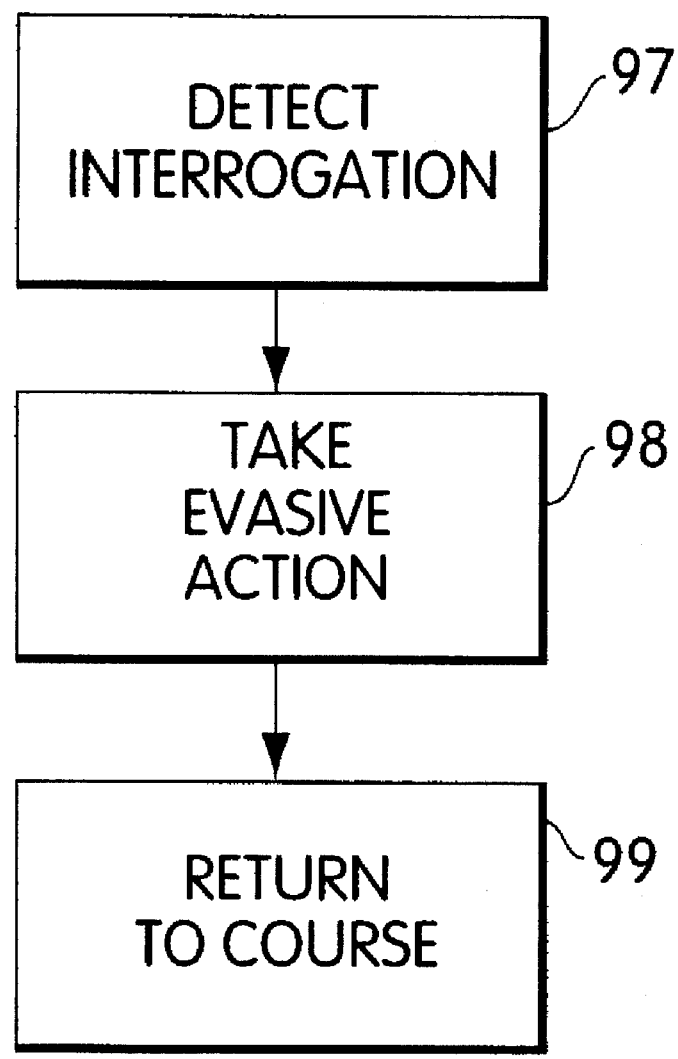
FIG. 6 is a high-level flowchart of an autonomous evasion method according to still another aspect of the invention.

Referring to FIG. 6, in accordance with still another aspect of the invention, an expendable underwater vehicle includes the ability to autonomously take evasive action (step 98) when the vehicle detects that it is being tracked by active acoustic interrogations (step 97). After taking the evasive action, the vehicle preferably returns to its originally-set course (step 99).

As mentioned previously, the variable speed feature can be coupled with this autonomous evasion capability to provide a low cost target capable of simulating typical behaviors of, for example, a diesel submarine taking evasive maneuvers. Combining both the variable speed and the variable tonal levels features with the autonomous evasion feature results in a vehicle having even greater training capabilities and possibilities.

Figure 7:
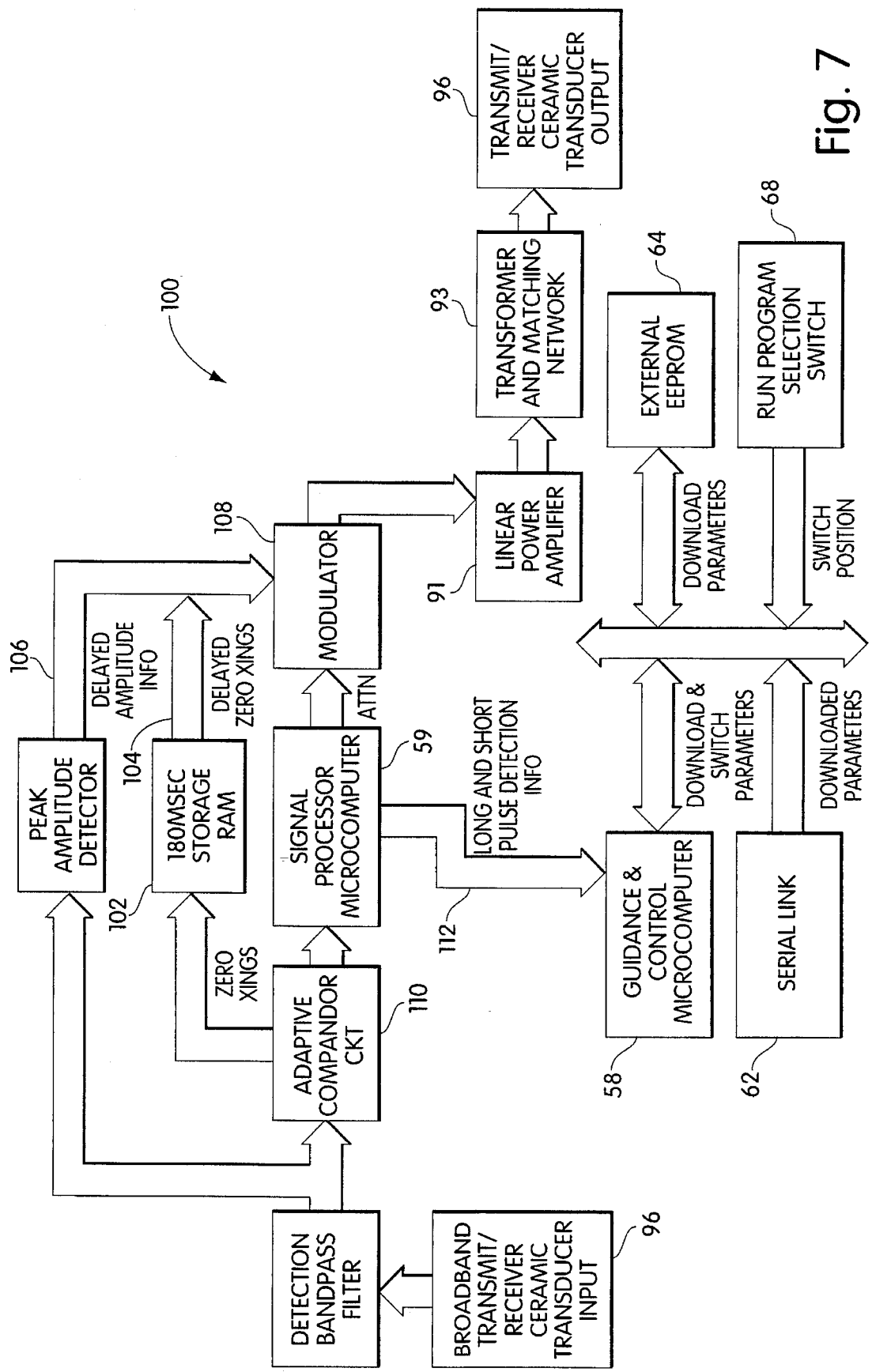
FIG. 7 is a block diagram of an autonomous evasion system for implementing the method of FIG. 6.

Referring to FIG. 7, the expendable underwater vehicle according to this aspect of the invention includes an autonomous evasion system 100. In this system 100, the signal processing functions of the vehicle are performed by the signal processor microcomputer (SPM) 59 and the guidance and control functions are performed by the guidance and control microcomputer (GCM) 58. The SPM 59 receives and transmits broadband sonar signals via a broadband acoustic transducer 96. The incoming acoustic signals/interrogations received on the transducer 96 and detected by the SPM 59 are stored for a certain period of time, preferably 180 milliseconds, in a volatile memory 102 such as a RAM, and then the stored signals are echo repeated using the same transducer 96.

Note that the linear amplifier 91 in FIG. 7 performs generally the same function as the linear amplifier 92 in FIG. 5. Also, the transformer and matching network 93 in FIG. 7 performs generally the same function as the network 94 of FIG. 5.

The repeater portion of the active echo receiver/repeater function implemented by the SPM 59 is actually a pseudo echo repeater function. That is, the SPM 59 stores frequency threshold-crossing information and peak amplitude information for the incoming signals, adds gain to the peak amplitude signals 106 to provide target strength, and then transmits a modulated version of the original incoming signal. A modulator 108 performs the modulation by chopping the amplified peak level signals with the frequency threshold-crossing information stored in the memory 102.

The receiver portion of the active echo receiver/repeater function implemented by the SPM 59 is essentially an adaptive threshold broadband energy detector function. That is, while the detection thresholds are fixed, a compandor circuit 110 is placed in the detection path to compress or expand the average input signal to normalize it's average output power and thereby enhance performance of the receiver in the presence of time-varying noise.

When the SPM 59 determines, from the type of incoming signal, that the vehicle is being actively tracked (step 97 in FIG. 6), the SPM 59 sends the GCM 58 (via a link 112) the information required to take evasive action. The exact type of incoming signal which triggers the SPM 59 into sending the information to the GCM 58 to initiate evasive action is pre-programmed into the vehicle at the factory and typically is based on the preference of the ultimate user of the vehicle. In a preferred embodiment, the vehicle will take evasive action when the incoming signal is a predetermined number of pulses received within a predetermined time period. Once the GCM 58 receives from the SPM 59 the proper information via the link 112, the GCM 58 will command the vehicle to execute a factory pre-programmed evasive maneuver for a predetermined period of time (step 98 in FIG. 6) and then to return back to the originally-set course (step 99 in FIG. 6).

Along with the run geometries, the evasive maneuvers to be taken by the expendable underwater vehicle are pre-programmed into the vehicle at the factory. The vehicle also can be pre-programmed at the factory with speed profiles and/or variable tonal level information, in accordance with other aspects of the invention. All or any combination of this information can be downloaded at the factory to the GCM 58 via the link 62. The GCM 58 stores this information in the memory 64, and the accesses and uses the information during in-water operation to control the vehicle's evasive maneuvers and other movement. These movements can include pre-programmed depth, heading, and speed changes. Also, there can be tonal level variations throughout the course, as described previously with reference to FIG. 5 and Table 2. In a preferred embodiment, the particular evasive maneuvers taken by the vehicle are dictated by the position of the run program selection switch 68 which is provided on the vehicle exterior to allow a field user to select one of the six possible run geometries. The user can specify the particular evasive maneuvers and the relationship between them and switch 68 position, and the desired relationship is then pre-programmed into the vehicle at the factory.

Tables 3A and 3B show an example of "run geometry/ speed profile/tonal level variations/evasive actions" data for a single run. As with Tables 1 and 2, each row ("segment") of Table 3A indicates actions which the vehicle will take and for how long. Tables 3A and 3B provided an example of user-specified evasive maneuver information.

TABLE 3A

| SEGMENT | RELATIVE DEPTH (feet) | RELATIVE HEADING (dg mag) | ABSOLUTE SPEED (knots) | ABSOLUTE TONAL ATTN (dB) | SEGMENT DURATION TIME (mins) | RELATIVE EXIT TIME (mins) |
|---|---|---|---|---|---|---|
| 1 | Table 3B | +45 | 2 | 40 | 2 | +2 |
| 2 | Table 3B | +45 | 2 | 40 | 3 | +5 |
| 3 | Table 3B | +45 | 2 | 40 | 2 | +7 |
| 4 | Table 3B | +45 | 2 | 40 | 4 | +11 |
| 5 | Table 3B | +45 | 2 | 40 | 2 | +13 |
| 6 | Table 3B | −45 | 10 | 0 | 2 | +15 |
| 7 | Table 3B | −45 | 10 | 0 | 2 | +17 |
| 8 | Table 3B | −45 | 10 | 0 | 2 | +19 |
| 9 | Table 3B | −45 | 10 | 0 | 2 | +21 |
| 10 | Table 3B | −45 | 10 | 0 | 2 | +23 |

TABLE 3B

| DEPTH INDEX | DEPTH (feet) | RELATIVE DEPTH (feet) |
|---|---|---|
| 0 | 75 | +525 |
| 1 | 150 | +450 |
| 2 | 225 | +375 |
| 3 | 300 | +300 |
| 4 | 375 | −300 |
| 5 | 450 | −375 |
| 6 | 525 | −450 |
| 7 | 600 | −525 |

PINGER

In accordance with a further aspect of the invention, an expendable underwater vehicle includes a high-power acoustic pinger integrated thereinto. Physically, the entire high-power pinger is contained within the small vehicle. The pinger creates particular acoustic signals which are required to track the vehicle on an instrumented training range such as the Southern California Offshore Range Extension (SCORE) range and the Atlantic Undersea Test and Evaluation Center (AUTEC) range. The integral pinger does not interfere with any other functions which the vehicle must perform, and the vehicle retains it's full submarine simulation capabilities (as described, for example, previously under the heading "Variable Tonal Levels").

Figure 8:
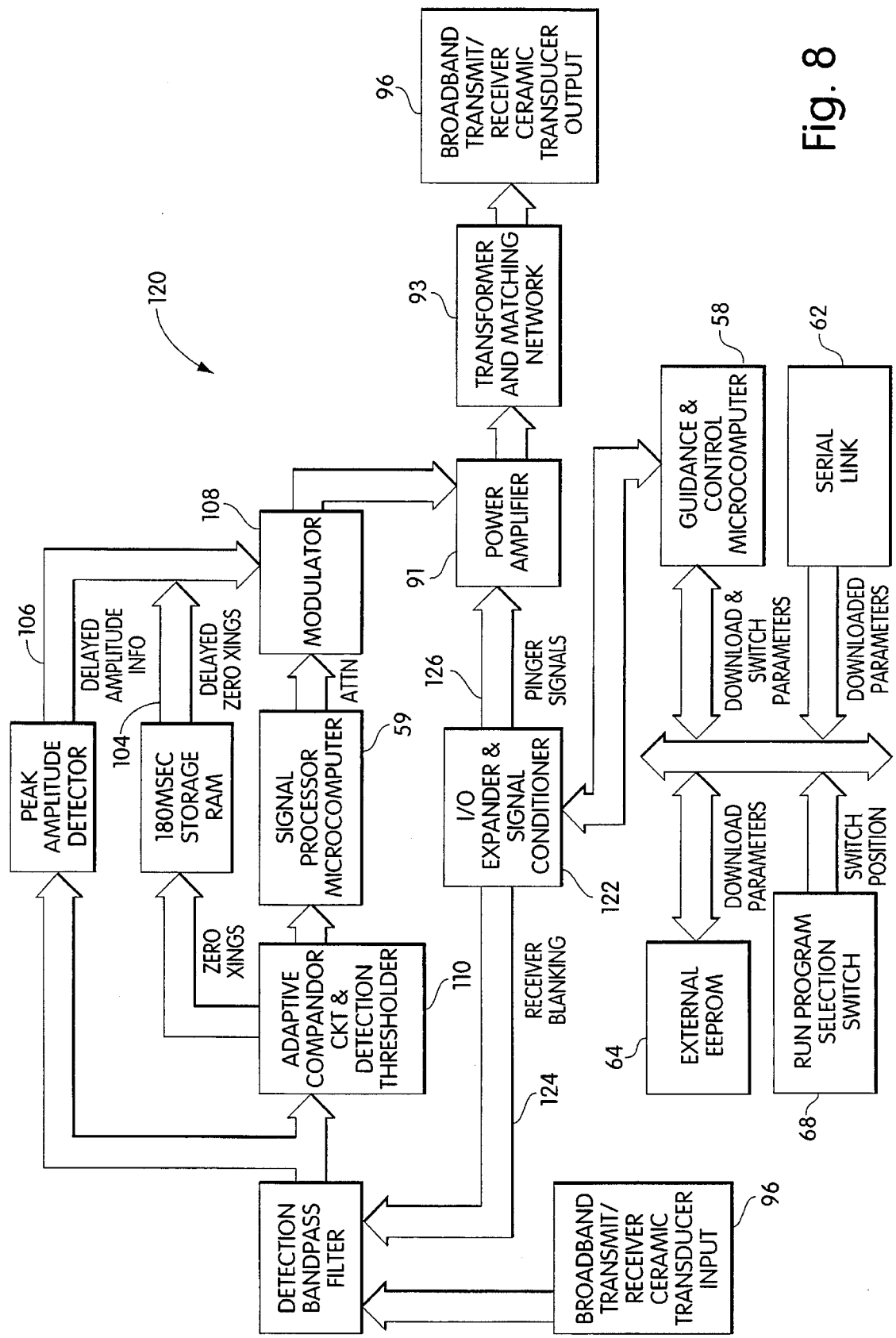
FIG. 8 is a block diagram of an integrated pinger system according to yet another aspect of the invention.

Referring to FIG. 8, an integrated pinger system 120 according to this aspect of the invention includes much of the same elements and functionality as described previously with reference to FIG. 7. In addition, the integrated pinger system 120 includes an input/output (I/O) expander and signal conditioner circuit 122 in communication with the guidance and control microcomputer (GCM) 58. The GCM 58 and the circuit 122 together form the main portion of the "high-power acoustic pinger" referred to in the preceding paragraph.

The GCM 58 uses its spare processing time to create a pinger signal 126. More specifically, in its spare processing time, the GCM 58 instructs the circuit 122 to temporarily halt the broadband transducer's 96 receiving functions (124), and the GCM 58 then sends the pinger signal 126 via the circuit 122 to the amplifier 91 and ultimately to the transducer 96 which projects the acoustic pinger signal into the ocean. Thus, the pinger function is achieved by sharing resources already available in the vehicle, those resources being the GCM 58 and the broadband transducer 96.

Because the GCM 58 uses its spare processing time to create the pinger signal and because the signal is projected into the ocean by the broadband transducer 96, the vehicle retains the ability to generate the full four-tonal passive acoustic submarine signature. Also, by using the spare processing time of the GCM 58 to create the pinger signal, this integrate pinger improvement has a very low cost associated therewith because no additional microcomputer, or other significant electronic component, is necessary to achieve the expanded functionality. Use of the GCM's spare processing time also means that pinger signal generation will never interfere with any of the other functions that the GCM 58 performs because by definition the GCM 58 only generates pinger signals when it is not performing some other task.

The sound pressure level (SPL) of the pinger signals created by the GCM 58 is from about 174 dB//uPa at 1 meter to about 184 dB//uPa at 1 meter. That is, the pinger signals are high-power. In a preferred embodiment, the SPL of a pinger signal is about 182 dB//uPa at 1 meter. This high output pinger level allows the expendable underwater vehicle 10 to be tracked in high sea states and at tracking ranges which utilize hydrophones located at greater depth and/or with wider hydrophone spacing.

The GCM 58 can be pre-programmed at the factory with the desired pinger signal parameters via the link 62. In a preferred embodiment, the pinger signal parameters are as shown in Table 4. Definitions of the pinger signal parameters are provided after Table 4. Table 4 covers the parameters for a pinger which is compatible with an AUTEC and SCORE range. Other pinger formats are possible.

The GCM 58 stores these pinger parameters in the memory 64. During in-water operation, the GCM 58 reads these parameters and uses them to generate the pinger signals.

TABLE 4

| PARAMETER | ALLOCATION | UNITS | DEFAULT |
|---|---|---|---|
| Pinger Enable/Disable | 1 bit | n/a | none |
| Pinger Type | 1 bit | n/a | none |
| Repetition Rate | 2 bits | table index | 0 |
| Target ID | 4 bits | table index | 0 |
| Repetition Rate Table | 4 bytes | integral # of 0.5 seconds | n/a |
| Pre-Ping Blanking | 1 byte | 1 millisecond | 5 |
| Short Post-Ping Blanking | 1 byte | 1 | 100 |

TABLE 4-continued

| PARAMETER | ALLOCATION | UNITS | DEFAULT |
|---|---|---|---|
| Long Post-Ping Blanking | 1 byte | 1 | 250 |
| Pulse Width | 1 byte | 1 microsecond | 20 |
| Frequency | 1 byte | 1 microsecond | .54 or 57 |
| Frame Pulse Repetition Rate | 1 byte | integral # of 0.5 seconds | 16 |
| Number of Cycles/Base Pulse | 1 byte | cycles | 40 |
| Number of Cycles/Frame Pulse | 1 byte | cycles | 135 |
| Target ID Messages | 48 bytes | n/a | n/a |

The definitions of the pinger parameters from Table 4 are as follows.

Pinger Enable/Disable—This bit controls the execution of the pinger processes. When set, the GCM processes continue to load the remaining pinger parameters into program variables. If not set, the pinger process is disabled.

Pinger Type—This bit selects either AUTEC pinger (a particular frequency ping) or the SOCAL pinger (a different frequency ping).

Repetition Rate—These two bits are an index into the Repetition Rate Table ($2^2$=four possible repetition rates).

Target ID—These four bits are an index into the Target ID Message Table ($4^2$=sixteen possible target IUs).

Repetition Rate Table—This four byte table stores the four possible repetition rates. Each repetition rate is expressed as an integral number of 0.5 second clock ticks. The range for each repetition rate is 0.5 seconds to 128 seconds.

Pre-Ping Blanking—This byte specifies the blanking time before the first ping pulse, and the units of this time are milliseconds with a range of 1 millisecond to 255 milliseconds.

Short Post-Ping Blanking—This byte specifies a short, post-ping blanking time, and the units are milliseconds with a range of 1 millisecond to 255 milliseconds. This parameter is used by the AUTEC pinger process only.

Long Post-Ping Blanking—This byte specifies a long, post-ping blanking time, and the units are milliseconds with a range of 1 millisecond to 255 milliseconds. This parameter is used by both the AUTEC and SOCAL pinger processes.

Pulse Width—This byte specifies the pulse width of a single cycle, and the units are microseconds with a range of 10 microseconds to 265 microseconds.

Frequency—This byte specifies the frequency of a single cycle, and it also specifies the low time of a single cycle. This parameter, in conjunction with the Pulse Width parameter, can be used to adjust the frequency of a single cycle. This parameter is expressed in microseconds with a range of 10 microseconds to 265 microseconds.

Frame Pulse Repetition Rate—This byte specifies the repetition rate of the frame pulse for the AUTEC pinger, and it is expressed as an integral number of 0.5 second clock ticks. The number of base pulses is a function of the Repetition Rate and the Frame Pulse Repetition Rate. The Frame Pulse Repetition Rate (when expressed as a period) must be greater than the Repetition Rate. The number of base pulses (NOBP) equals the quantity Frame Pulse Repetition Rate (FPRR) divided by Repetition Rate (RR) minus one: NOBP=(FPRR/RR)−1.

Number of Cycles per Base Pulse—This byte specifies the duration of an AUTEC pinger base (standard) pulse, and it is expressed as the number of cycles for a base (standard) pulse.

Number of Cycles per Frame Pulse—This byte specifies the duration of an AUTEC pinger frame pulse, and it is expressed as the number of cycles for a frame pulse.

Target ID Messages—This 48 byte linear array contains sixteen possible target ID messages. Only twelve of the sixteen messages are defined for the SOCAL pinger. The other four array elements are allocated for future expansion.

While FIGS. 3, 5, and 7 generally do not show connections to a power source for each of the components requiring power to operate, it should be understood that each such component is in fact connected to a source of power. For each component requiring power to operate, the battery 36 generally provides the necessary power thereto.

Variations, modifications, and other implementations of what is described herein will occur to those of ordinary skill in the art without departing from the spirit and the scope of the invention as claimed. Accordingly, the invention is to be defined not by the preceding illustrative description but instead by the following claims.

What is claimed is:

1. An expendable underwater vehicle for use in training naval forces in anti-submarine warfare in ocean water, comprising:
   a body having a length along a longitudinal axis of about three to five feet and a diameter of about five inches, the body comprising
      a shroud at a rear end of the body which includes a propeller, elevators, and rudders;
      actuators for controlling the elevators and the rudders;
      an internal motor for driving the propeller;
      an internal guidance and control subsystem for implementing a predetermined path for the vehicle in the ocean water by controlling the motor and the actuators to cause the vehicle to conform to the path;
      an internal signal processing subsystem for simulating a submarine by generating signals representative of the submarine, causing corresponding acoustic signals to be transmitted into the ocean water, and varying the amplitudes of the acoustic signals which comprise
         a first acoustic signal having a frequency of about 450 Hz and a variable amplitude having a range of about 40 dB,
         a second acoustic signal having a frequency of about 600 Hz and a variable amplitude having a range of about 40 dB,
         a third acoustic signal having a frequency of about 720 Hz and a variable amplitude having a range of about 40 dB, and
         a fourth acoustic signal having a frequency of about 900 Hz and a variable amplitude having a range of about 40 dB; and
      an internal power source for powering the signal processing subsystem, the guidance and control subsystem, the motor, and the actuators.

2. An expendable underwater vehicle for use in training naval forces in anti-submarine warfare in ocean water, comprising:
   a body having a length along a longitudinal axis of about three to five feet and a diameter of about five inches, the body comprising
      a shroud at a rear end of the body which includes a propeller, elevators, and rudders;
      actuators for controlling the elevators and the rudders;
      an internal motor for driving the propeller;
      an internal guidance and control subsystem for implementing a predetermined path for the vehicle in the ocean water by controlling the motor and the actuators to cause the vehicle to conform to the path;
      an internal signal processing subsystem for simulating a submarine by generating signals representative of the submarine and causing corresponding acoustic signals to be transmitted into the ocean water, the internal signal processing subsystem also for receiving and detecting predetermined acoustic interrogation signals and then, in response thereto, instructing the internal guidance and control subsystem to deviate from the path for a predetermined period of time and then to return to the path after the predetermined period of time has expired; and
      an internal power source for powering the signal processing subsystem, the guidance and control subsystem, the motor, and the actuators.

3. An expendable underwater vehicle for use in training naval forces in anti-submarine warfare in ocean water on an instrumented naval tracking range, comprising:
   a body having a length along a longitudinal axis of about three to five feet and a diameter of about five inches, the body comprising
      a shroud at a rear end of the body which includes a propeller, elevators, and rudders;
      actuators for controlling the elevators and the rudders;
      an internal motor for driving the propeller;
      an internal guidance and control subsystem for implementing a predetermined path for the vehicle in the ocean water by controlling the motor and the actuators to cause the vehicle to conform to the path, the guidance and control subsystem also for generating signals representative of acoustic pinger signals needed to track the vehicle on the instrumented naval tracking range and causing the acoustic pinger signals to be transmitted into the ocean water at an amplitude level of about 174 to 184 dB//uPa at 1 meter;
      an internal signal processing subsystem for simulating a submarine by generating signals representative of the submarine and causing corresponding acoustic signals to be transmitted into the ocean water; and
      an internal power source for powering the signal processing subsystem, the guidance and control subsystem, the motor, and the actuators.

* * * * *